March 19, 1935.  A. J. FREEMAN  1,994,468

MARKING OF FOOD PRODUCTS

Filed Sept. 12, 1933

Inventor
Alpheus J. Freeman
By Glenn S. Noble
Atty.

Patented Mar. 19, 1935

1,994,468

UNITED STATES PATENT OFFICE 1,994,468

MARKING OF FOOD PRODUCTS

Alpheus J. Freeman, Chicago, Ill.

Application September 12, 1933, Serial No. 689,105

5 Claims. (Cl. 99—11)

Sausage, and particularly the kind enclosed in casings or skins, is generally recognized as an important food product, particularly when made of proper materials and properly prepared. However, the nature of the product is such that many manufacturers make the same from poor materials or under unsanitary conditions and sell such goods in such a manner that they may be readily substituted for the goods of reputable manufacturers. Heretofore no satisfactory method or means has been devised for marking, or applying the manufacturer's mark to such goods in a way that will prevent the more or less ready removal of the same or in a way which will assure the purchaser of the origin of the goods.

The present invention relates to means for marking food products such as sausage which is inclosed in casings, so that the marking will remain permanent until the goods are in the hands of the user and preferably arranging the marking so that it cannot be destroyed until the goods are consumed.

It is also generally known that some types of skins or casings could be profitably used except for the fact that they are too thin or fragile to stand the handling.

Another object of my invention is the provision of means for strengthening the sausage or reinforcing the casing so that such weaker skins may be utilized.

In general the objects of my invention are to provide improved sausages or other food products enclosed in casings; to provide means for trade marking sausages, bologna, "hot dogs", or the like; and to provide such other advantages as will appear from the following description.

In the accompanying drawing illustrating this invention,

Figure 1:
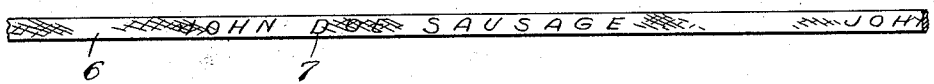
Figure 1 shows one form of marking strip such as a tape which may be made of cotton, silk, rayon, an edible substance, or other suitable material, and which may be colored for identification or may bear thereon the name of the manufacturer.
Figure 2:
Figure 2 is a view showing another marking strip or member which may comprise a cord.
Figure 3:
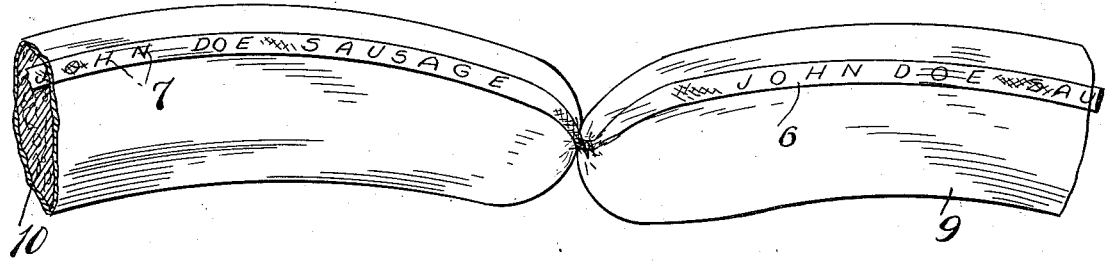
Figure 3 is a side view showing portions of two connected links of sausage with my marking applied thereto.
Figure 4:
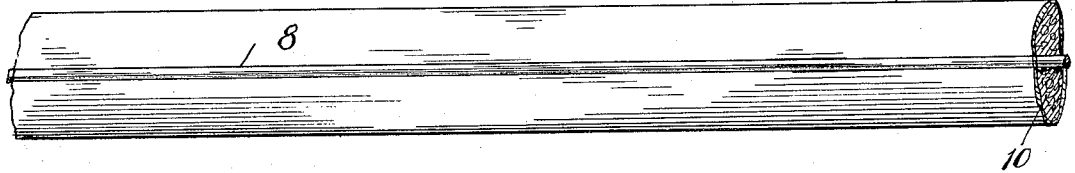
Figure 4 is a view similar to Figure 3 showing the sausage as it is discharged from a sausage filler with my marking strip incorporated therein, and before the sausage is twisted.
Figure 5:
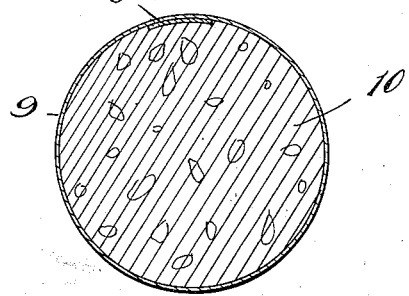
Figure 5 is a sectional view.

As shown in the drawing, Figures 1 and 2 illustrate in general strips, cords, or bands of any suitable edible or nonedible material which may be utilized in the marking of the sausage or food product. The strip 6 shown in Figure 1 preferably represents a flat tape upon which the trade-mark or name of the manufacturer such as indicated as 7 may be printed or impressed. A string or cord 8 such as shown in Figure 2 may also be utilized, such cord alone serving to identify the goods, or it may be colored or formed in different designs for such purpose. When the sausage or food product is being stuffed into the skins or casings, as by means of a sausage filler, my marking or identifying strip is fed in, or inserted in such a manner that it will lie close to the inner surface of the casing 9 as shown particularly in Figures 3 and 4. Such casings are usually transparent or sufficiently transparent so that the marking strip may be readily observed therethrough. The sausage or filling 10 which is packed tightly in the casings will of course hold the marking strip in its position adjacent to the surface. If it is desired to add strength or support to the sausage casing, a strip or support such as shown in Figure 1 comprising tape, may be utilized and it will be noted that when the sausages are twisted to provide links as shown in Figure 3, the twist will include the strip so that the links will be strengthened at such points.

When the sausage provided with my improved marking is to be eaten, the links may be severed and the projecting end of the tape or cord may be used for ripping open the casing so that it may be more readily removed from the contents.

While I have illustrated and described preferred forms of my marking and reinforcing means it will be understood that changes may be made in the markers or method of applying to adapt the same for different products or different types of sausages and therefore I do not wish to have the invention considered as being limited to the particular disclosure other than as set forth in the following claims, in which I claim.

1. The combination with a linked sausage product enclosed in a casing or the like, of a tape arranged within the casing adjacent to the inner surface thereof and extending lengthwise of the casing and into the twisted neck thereof and serving to reinforce the same and also serving as means for opening the casing to provide access to the material therein.

2. In a sausage of the type in which the sausage meat is stuffed in a casing and the casing twisted at intervals to form links, the combination with the casing and the material therein, of a strip of suitable material for re-enforcing the casing and for designating the source of manufacture of the sausage, extending longitudinally thereof and through the twisted necks and positioned between the casing and the filling and held in position by the filling, the strip being visible through the casing.

3. The combination with a link sausage, including the casing and the filling therein, of a member for strengthening the sausage extending longitudinally of the links and through the twisted neck portions thereof and held in position against the inner surface of the casing by the material enclosed therein whereby said identifying member will be visible through the casing.

4. The combination with a linked sausage product enclosed in a casing or the like, of a strip of suitable material arranged within the casing adjacent to the inner surface thereof and extending lengthwise of the casing and into the twisted neck thereof and serving to reinforce the same.

5. The combination with a linked sausage having a casing, of a cord extending longitudinally of the casing and through the twisted neck portions thereof and serving as a label means for identifying the manufacturer of the sausage and to strengthen or reenforce the casing.

ALPHEUS J. FREEMAN.